May 5, 1925.

F. S. MOORE ET AL

SIFTING OR SEPARATING MACHINE

Filed Nov. 19, 1924

Inventors
Frank S Moore
Otto R Van Boehm by Randolph Saile
his Attorney.

Patented May 5, 1925.

1,536,124

UNITED STATES PATENT OFFICE.

FRANK S. MOORE, OF CHESTER, AND OTTO R. VAN BOEHM, OF SCOTTDALE, PENNSYLVANIA.

SIFTING OR SEPARATING MACHINE.

Application filed November 19, 1924. Serial No. 750,947.

*To all whom it may concern:*

Be it known that we, FRANK S. MOORE and OTTO R. VAN BOEHM, citizens of the United States, residing, respectively, at Chester, in the county of Delaware, State of Pennsylvania, and at Scottdale, county of Westmoreland, said State, have invented a new and useful Sifting or Separating Machine, of which the following is a specification.

Our invention relates to improvements in sifting and separating machines, in which the material to be sifted is passed through a series of screens or perforated platforms having apertures of successively decreasing size; and the objects of our improvements are (first), to reduce the space occupied by such machines, especially when sifting or separating substances are of relatively large sized pieces, such as coal and ores; (second), to reduce the strain and vibration usual in sifting processes; and (third), to provide a sifting machine that will be more efficient, simple and less costly in construction and maintenance than those heretofore used.

Figure 1:
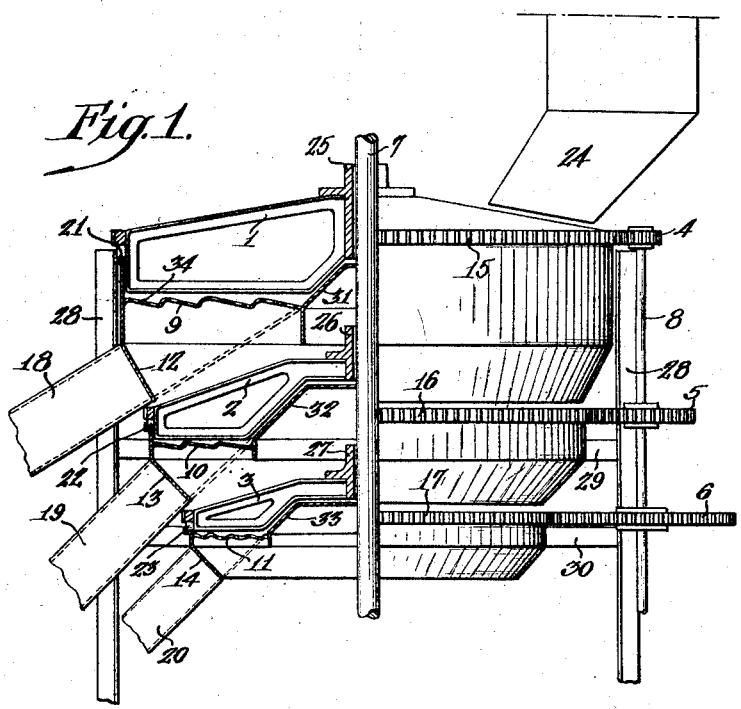
Figure 2:
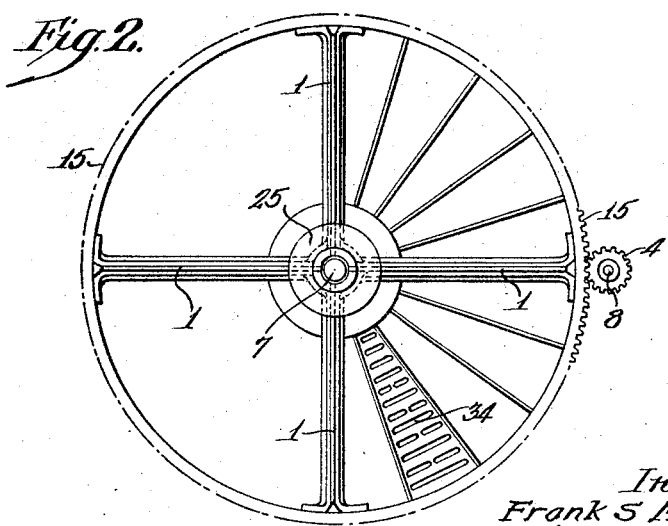

These objects we attain by the machine illustrated in the accompanying drawings, in which Figure 1 is a front view of the machine, showing one-half thereof in vertical section, and Figure 2 is a plan view, showing a section of the perforated platform or screen and the paddles operating thereover. Similar numerals indicate similar parts in both figures.

The framework of the machine consists of the fixed central shaft 7 and the uprights 28, which may be four or more in number, and between which are rigidly attached the containing chambers by means of the cross pieces 29 and 30. These chambers are superimposed one above the other, about the shaft 7, and are provided with perforated platforms or screens 9, 10 and 11, and funnel-shaped extensions 12, 13 and 14, to guide the screened material into the subjacent chamber. Within the chambers are the paddles or scrapers 1, 2 and 3 rotatably mounted on the shaft 7. Each paddle is of a sufficient height to extend above the side wall of the respective chambers, and rigidly attached to the outer extremities of the paddles are circular gears 15, 16 and 17, which travel freely over the top of the respective chambers by means of idler rolls 21, 22 and 23, where the size and weight of the machine make such rolls desirable. The gears 15, 16 and 17 are driven by pinions 4, 5 and 6, mounted on a revolving shaft 8, to which power may be applied in any manner desired.

The perforated platforms or screens 9, 10 and 11 are constructed of a series of annular sections, each inclined downwardly from the circumference toward the centre, with short rises to connect the depressed end of one annular section with the elevated end of the adjacent interior section, and the platforms may be made in separate sections or of one piece of material, provided the shape indicated is preserved.

Above the topmost chamber is the feeding hopper 24 and each chamber is provided with a discharge chute 18, 19 and 20, which is set through the chamber wall and connected to a radial opening in the perforated platform or screen of its respective chamber.

In operation, the material to be screened is delivered through the feeding hopper into the topmomst chamber, is swept over the screen by the paddle or scraper, the smaller pieces falling through the perforations and the retained material swept through the opening in the platform or screen into the discharge chute. The tendency of the paddle will be to throw the mass of material toward the circumference of the chamber, and the inclined annular formation of the platform or screen will cause the loose and broken particles to roll toward the centre, thus increasing the dislocation of all small particles from the mass and permitting them to fall through the perforated platform or screen into the subjacent chamber where the operation is again repeated until the desired degree of screening has been obtained.

It is obvious that if desired, the bottommost chamber may have a flat unperforated platform for retaining all of the residue of the screened material for discharge through an appropriate chute. The chambers are of progressively decreasing size and the driving pinions of progressively increasing size, thereby increasing the speed of revolution of the paddles from top to bottom, as the material to be screened is composed of smaller and lighter pieces.

We claim—

1. In an upright screening machine, the combination with a central fixed shaft, of a series of perforated platforms or screens, paddles or scrapers rotatably mounted on said central shaft above each platform, circular gears rigidly connected to the outer extremities of the paddles, means for driving said gears, and chutes connected with said platforms for delivering the material retained thereon.

2. In an upright screening machine, the combination of a feeding hopper with a series of fixed screening platforms of successively diminishing mesh set about a central fixed shaft, funnel-shaped members to convey the screened material to the subjacent platform, paddles rotatably mounted on said shaft, means connected with the same driving shaft to move said paddles over the surface of said platforms at successively increasing velocities and chutes connected with said platforms to deliver the material retained thereon.

3. In an upright screening machine, a series of circular chambers superimposed one above the other about a central fixed shaft, each chamber containing a perforated platform or screen composed of annular sections inclined downwardly from the circumference to the centre and an open funnel-shaped extension thereunder, paddles rotatably mounted on said shaft and within each chamber, circular gears connecting the outer ends of said paddles, means, exterior to said chambers, to drive said gears, and chutes respectively connected to openings in the platforms in each chamber for delivering the material retained thereon.

4. In an upright screening machine, a series of perforated platforms or screens, superimposed one above the other, each platform or screen consisting of a series of annular sections, inclined downwardly from the circumference to the centre, and means for moving thereover the material to be screened.

FRANK S. MOORE.
OTTO R. VAN BOEHM.